(12) United States Patent
Woo et al.

(10) Patent No.: US 11,959,312 B2
(45) Date of Patent: Apr. 16, 2024

(54) VEHICULAR LATCH BUSHING WITH CABLE INTERFACE

(71) Applicant: MAGNA CLOSURES INC., Newmarket (CA)

(72) Inventors: Kar Wang Woo, Markham (CA); Neil Guillermo, Richmond Hill (CA); Amarinder Singh, Brampton (CA)

(73) Assignee: MAGNA CLOSURES INC., NewMarket (CA)

( * ) Notice: Subject to any disclaimer, the term of this patent is extended or adjusted under 35 U.S.C. 154(b) by 612 days.

(21) Appl. No.: 16/406,241

(22) Filed: May 8, 2019

(65) Prior Publication Data
US 2019/0345744 A1 Nov. 14, 2019

Related U.S. Application Data

(60) Provisional application No. 62/668,379, filed on May 8, 2018.

(51) Int. Cl.
*E05B 79/20* (2014.01)
*E05B 85/02* (2014.01)
*F16C 1/10* (2006.01)

(52) U.S. Cl.
CPC .............. *E05B 79/20* (2013.01); *E05B 85/02* (2013.01); *F16C 1/107* (2013.01); *E05Y 2900/531* (2013.01)

(58) Field of Classification Search
CPC .......... E05B 79/20; E05B 85/02; F16C 1/107; E05Y 2900/531
See application file for complete search history.

(56) References Cited

U.S. PATENT DOCUMENTS

| | | | |
|---|---|---|---|
| 5,156,064 A | 10/1992 | Truman | |
| 5,410,102 A | 4/1995 | Guiol et al. | |
| 5,435,203 A | 7/1995 | Spease et al. | |
| 5,560,261 A | 10/1996 | Kitamura | |
| 5,696,351 A | 12/1997 | Benn et al. | |
| 6,405,613 B1 | 6/2002 | Lim | |
| 7,302,818 B2 * | 12/2007 | Usuzaki | E05B 17/042 285/319 |

(Continued)

FOREIGN PATENT DOCUMENTS

| | | |
|---|---|---|
| CN | 102758560 A | 10/2012 |
| CN | 103459735 A | 12/2013 |

(Continued)

*Primary Examiner* — Victor D Batson
*Assistant Examiner* — James Edward Ignaczewski

(57) ABSTRACT

A sealed latch assembly for a vehicle closure panel is provided. The latch assembly includes a housing having an interior sized for receipt of internal components of the latch assembly. A cover is attached to the housing to enclose at least a portion of the cavity. At least one release cable is configured for operable connection to at least one of the internal components. A cable bushing is attached to the cover. The latch bushing can have a coupling mechanism including a tab and slot arrangement for releasably coupling a body of the cable bushing in a receptacle of the cover. The latch bushing can have a retaining mechanism oriented transverse to the longitudinal axis for inhibiting disconnection of the cable bushing from the cover in a direction along the longitudinal axis.

22 Claims, 8 Drawing Sheets

(56) References Cited

U.S. PATENT DOCUMENTS

| | | | | |
|---|---|---|---|---|
| 8,727,287 B2 * | 5/2014 | Trouve | .................... | F16C 1/265 |
| | | | | 248/56 |
| 2006/0214467 A1 * | 9/2006 | Usuzaki | ................ | E05B 17/041 |
| | | | | 296/146.1 |
| 2008/0067294 A1 * | 3/2008 | Heller | ................. | B60R 16/0222 |
| | | | | 248/56 |
| 2014/0251062 A1 * | 9/2014 | Snodgrass | ............... | F16C 1/226 |
| | | | | 74/502.4 |
| 2016/0060908 A1 * | 3/2016 | Kim | ........................ | E05B 79/20 |
| | | | | 292/336.3 |
| 2016/0377111 A1 | 12/2016 | Rake et al. | | |

FOREIGN PATENT DOCUMENTS

| | | | | |
|---|---|---|---|---|
| CN | 104024548 A | 9/2014 | | |
| CN | 206625692 U | 11/2017 | | |
| DE | 10106871 A1 * | 9/2001 | ............. | E05B 79/04 |
| DE | 10045875 A1 * | 3/2002 | ......... | B60R 16/0222 |
| DE | 10045875 A1 | 3/2002 | | |
| DE | 102006032892 A1 * | 1/2008 | ........... | E05B 53/005 |
| DE | 102006032892 A1 | 1/2008 | | |
| DE | 102013206889 A1 * | 10/2014 | ............. | B60K 15/05 |
| DE | 102018100181 A1 | 7/2019 | | |
| DE | 102018100181 A1 * | 7/2019 | | |
| JP | H0571379 U | 7/1995 | | |
| JP | 2009197985 A | 3/2002 | | |
| JP | 2009197985 A * | 9/2009 | | |
| KR | 100836319 B1 | 6/2008 | | |
| KR | 20180032462 A * | 3/2018 | ............. | E05B 79/20 |

* cited by examiner

VEHICULAR LATCH BUSHING WITH CABLE INTERFACE

CROSS-REFERENCE TO RELATED APPLICATIONS

This application claims priority from U.S. Provisional Patent Application No. 62/668,379 filed on May 8, 2018; the entire contents of which are hereby incorporated by reference.

FIELD

The present disclosure relates generally to latch assemblies of vehicle closure panels, and more particularly to latch assemblies having bushings for interfacing with a release cable.

BACKGROUND

This section provides background information related to the present disclosure that is not necessarily prior art.

Vehicle doors are typically equipped with a latch assembly configured to allow selective opening and closing of the door. Latch assemblies commonly have multiple components assembled to one another, such as a housing and cover having peripheries brought into mating abutment with one another, as well as a multiple internal functional components contained within the housing/cover assembly. Further, openings are typically formed in the housing and/or cover via a cable bushing to allow for the through passage of one or more members, such as electrical wires or Bowden cables for example, for operable connection to one or more of the internal function components of the latch.

Problems can arise if water is permitted to enter the latch assembly. For example, the ingress of water can cause corrosion, and if allowed to freeze, can damage and/or jam internal components, thereby preventing internal components from functioning. Unfortunately, seams, through which water can penetrate, are established where the housing and cover interface with one another as well as via the cable bushing, and thus, potential damage and jamming can occur as a result thereof. The aforementioned problem can be particularly troublesome for latch assembly arrangements having openings in an upper surface for the passage of cables and/or wires, as gravity ultimately promotes the ingress of water there through. For example, latch assemblies configured to operate with Bowden cables often have openings into the latch assembly to allow the Bowden cables to penetrate the latch and interact with the internal latch components.

Furthermore, while preassembly of the latch with the Bowden cables sealed with the latch before the latch completion and shipment to an installer of the latch assembly to a door panel could be undertaken, such preassembly is expensive both from a logistical shipping point of view (having to ship a larger assembled component for example) and from an assembly line point of view (having to handle larger assembly components for example) and from a final inspection testing complexity point of view (the connections between the Bowden cables and the latch made during preassembly have to be verified).

Further, proper retention of the cable bushing once fastened to the latch housing is important, especially as tension forces (e.g. tugging) applied to the cable could result in undesirable disconnection of the cable bushing from the housing.

SUMMARY

This section provides a general summary and is not intended to be an exhaustive and comprehensive listing of all possible aspects, objective and features associated with the present disclosure.

It is an object of the present disclosure to provide a cable bushing to inhibit disconnection from the latch housing.

It is a further object of the present disclosure to provide a cable bushing to provide for servicing post installation.

A first aspect provided is a latch assembly for a vehicle closure panel, comprising: a housing having an interior sized for receipt of internal components of the latch assembly; a cover attached to the housing to enclose at least a portion of said interior; at least one cable, such as a release cable, configured for operable connection to at least one of the internal components, the at least one cable having a longitudinal axis; a cable bushing releasably attached to the cover and having at least one opening sized for receipt of the at least one cable there through; and a retaining mechanism oriented transverse to the longitudinal axis for inhibiting disconnection of the cable bushing from the cover in a direction along the longitudinal axis.

A second aspect provided is a latch assembly for a vehicle closure panel, comprising: a housing having an interior sized for receipt of internal components of the latch assembly; a cover attached to the housing to enclose at least a portion of the interior; at least one cable, such as a release cable, configured for operable connection to at least one of the internal components, the at least one cable having a longitudinal axis; a cable bushing releasably attached to the cover and having at least one opening sized for receipt of the at least one cable there through; and a coupling mechanism including a tab and slot arrangement for releasably coupling a body of the cable bushing in a receptacle of the cover, such that one of the tab or the slot is positioned on a resilient arm for biasing the tab into engagement with the slot when positioned adjacent thereto.

BRIEF DESCRIPTION OF THE DRAWINGS

The foregoing and other aspects will now be described by way of example only with reference to the attached drawings, in which.

Corresponding reference numerals indicate corresponding components throughout the several views of the drawings, unless otherwise indicated.

DESCRIPTION OF THE EXAMPLE EMBODIMENTS

Figure 1:
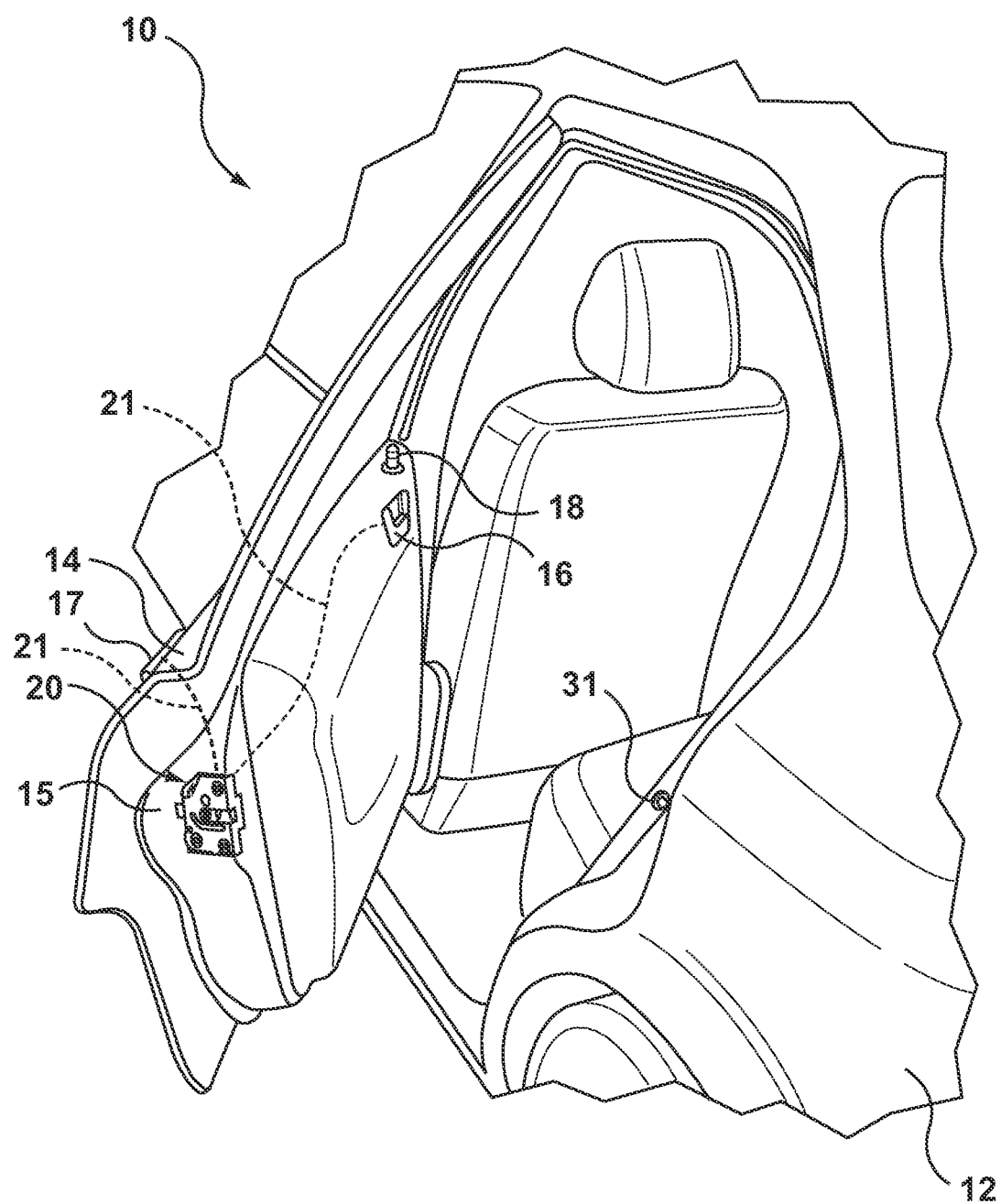
FIG. 1 is a partial perspective view of a motor vehicle equipped with a pivotal passenger-entry door with to a latch assembly.

Example embodiments of lockable release cable assemblies of the type configured for use with motor vehicle closure systems are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies, as would be evident to one skilled in the art upon viewing the disclosure herein, are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 is a perspective view of a vehicle 10 that includes a vehicle body 12 and at least one vehicle closure panel, shown as a vehicle door 14, by way of example and without limitation. The vehicle door 14 can also include an edge face 15, inside and outside door handles 16, 17, a lock knob 18, with a hinge pivotally fixing the door 14 to the vehicle body 12. A latch assembly 20 is positioned (e.g. sealingly affixed) against an inner surface of the edge face 15. The latch assembly 20 includes a latch mechanism having a pivotal latch (i.e. ratchet) member 24 (FIG. 2) that is releasably engageable with a striker 31 mounted on the vehicle body 12 to releasably hold the vehicle door 14 in a closed position. It is recognized that the pivotal latch member 24 is one of a number of internal components 13 of the latch assembly 20, such that operation of a wire or release cable 21 coupled to the latch assembly 20 results in operation of the latch mechanism (i.e. rotation of the pivotal latch member 24). It is recognized that other cable assemblies (e.g. cable 21), such as a lock/unlock cable assembly for actuating a latch unlock/lock kinematic chain, a cinch cable assembly for actuating a cinching function of the latch, a double-pull cable assembly for actuating a double pull release function of the latch, an electrical cable assembly for controlling/communication with electrical components within the latch, can also be provided for use with the cable bushing 19, as further described herein below. In the illustrative embodiments described herein and as shown for example in FIG. 2, the cable 21 can be a release cable operatively connected to one end to a vehicle door handle 16, 17 and is illustratively connected at its opposite end to a release lever 100 housed within the latch assembly 20 forming part of a release chain for transitioning the latch assembly 20 between a latched position and an unlatched position. It is recognized that in FIG. 2, by example, the cable 21 is connected to the release lever 100, which is in turn coupled to a pawl 13a. In the illustrated example, operation of the release lever 100 by the cable 21 in turn engages the pawl 13a in order to thus release the pivotal latch member 24 (e.g. the ratchet) and thus release the striker 31 from the latch assembly 20. As discussed, release of the striker 31 from the latch assembly 20 places the latch assembly 20 in the unlatched state. It is recognized in an alternative embodiment, the cable 21 could be directly connected to other internal components 13 (e.g. the pawl 13a or other types of levers—not shown) that provide for release of the pivotal latch member 24 upon operation of the cable 21, and thus ultimate release of the striker 31 from the latch assembly 20.

The lock knob 18 (optional) is shown and provides a visual indication of the lock state of the latch assembly 20 and may be operable to change the lock state between an unlocked state and a locked state. At least one of the handles 16, 17 is operably connected to the latch assembly 20 via the wire or release cable 21, such as a Bowden cable, by way of example and without limitation, for facilitating actuation of latch assembly 20 via intended (selective) operation of the handles 16, 17. Specifically, the release cable 21 operably connects one of handles 16, 17 to the moveable latch member release component 24 of the latch assembly 20 for opening or unlatching the latch assembly 20 (i.e. for releasing striker 31 from latched engagement with the latch member 24) to open the vehicle door 14. As is detailed hereafter, the latch assembly 20 is constructed and otherwise configured to inhibit the ingress of water therein, thereby inhibiting the potential for jamming of internal components due to freezing and further inhibiting the onset of corrosion.

Figure 3:
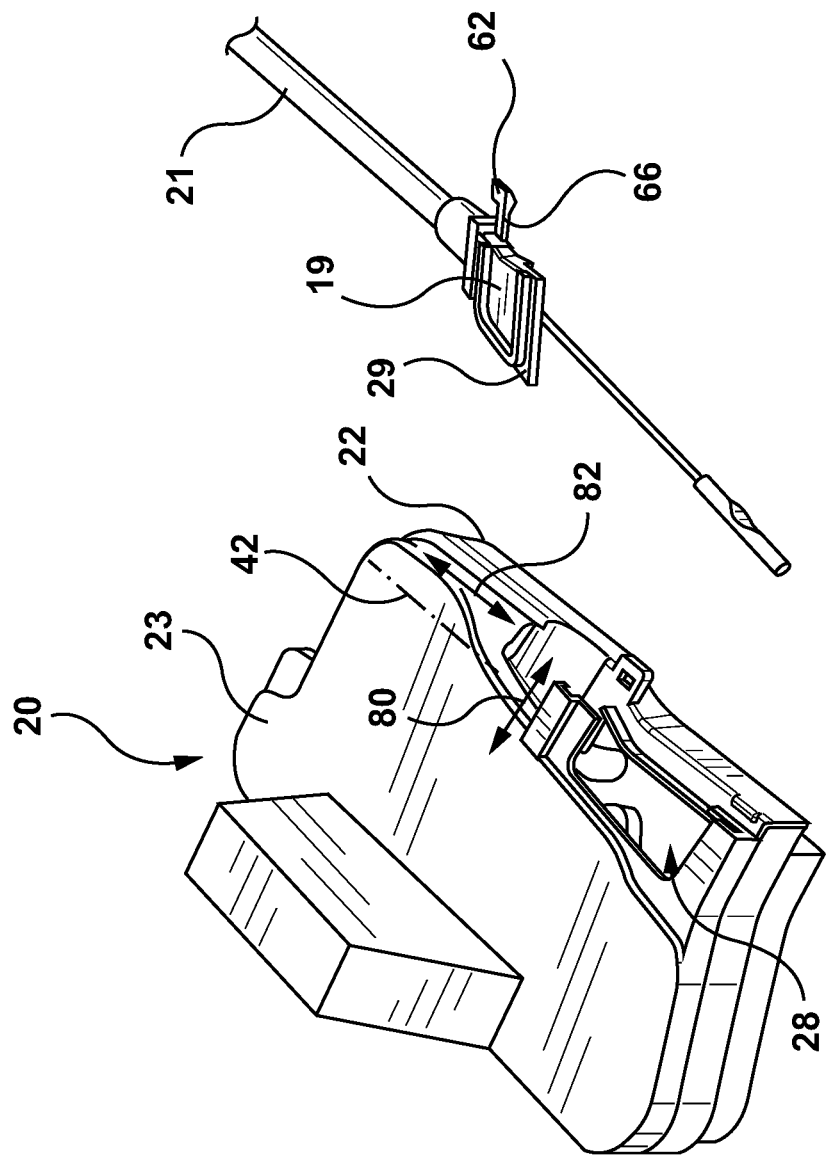
FIG. 3 is a plan view of a cable bushing of the latch shown in FIG. 2 in a disassembled state.

To facilitate the inhibition of water ingress, the latch assembly 20 includes a cable bushing 19 releasably connected to a cover 23 of a housing 22 of the latch assembly 20, see FIG. 3. It is recognized that an interface between the cover 23 and the housing 22 can include one or more seal members 8 to inhibit the ingress of water between openings in the housing 22 and/or cover 23. Further, it is recognized that an interface between the cover 23 and the cable bushing 19 can include one or more seal members 9 to inhibit the ingress of water, as well as for opening(s) 25 (see FIG. 4) formed to allow the wires and/or release cables 21 to pass there through into an interior 6 of the cover 23, in order to be connected with one or more of the internal components 13, such as a release lever 100 being operable to move a pawl 13a between a ratchet 13b engaging position for latching a striker 31 and preventing movement of the door 14, and a ratchet 13b disengaging position for releasing the striker 31 to allow the vehicle door 14 to move. Accordingly, the latch assembly 20 is able to function as intended, for an extended useful life, without concern of malfunction resulting from phenomenon related to the ingress of water, while at the same time providing for connection and release of the cable bushing 19 with respect to the cover 23. Further, the cable bushing 19 is coupled to the cover 23 so as to inhibit disconnection (once connected) via tension forces applied to the release cable 21 (e.g. during operation of the handle(s) 16, 17 and/or during installation/servicing of the release cable 21 via an installer of the latch assembly 20 for the closure panel 14).

In general, the closure panel 14 (e.g. occupant ingress or egress controlling panels such as but not limited to vehicle doors and lift gates/hatches) is connected to vehicle body 12 via one or more hinges (e.g. for retaining closure panel 14. Closure panel 14 can be referred to as a partition or door, typically hinged, but sometimes attached by other mechanisms such as tracks, in front of an opening which is used for entering and exiting vehicle 10 interior by people and/or cargo. It is also recognized that closure panel 14 can be used as an access panel for vehicle systems such as engine compartments and traditional trunk compartments of automotive type vehicles 10. It is to be recognized that the hinge(s) can be configured as a biased hinge that is operable to bias closure panel 14 toward the open position and/or toward the closed position, as desired. The vehicle body 12 can include the mating latch component 31 (e.g. striker) mounted thereon for coupling with a respective latching component 24 (i.e. the ratchet) of latch assembly 20 mounted on closure panel 14. Alternatively, latch assembly 20 can be mounted on vehicle body 12 and the mating latch component 31 can be mounted on the closure panel 14 (not shown, but will be readily understood by one skilled in the art). Closure panel 14 can be referred to as a partition or door, typically hinged, but sometimes attached by other mechanisms such as tracks, in front of an opening which is used for entering and exiting vehicle 10 interior by people and/or cargo. It is also recognized that closure panel 14 can be used as an access panel for vehicle systems such as engine compartments and traditional trunk compartments of automotive type vehicles 10.

Movement of the closure panel 14 (e.g. between the open and closed positions) can be electronically and/or manually operated, where power assisted closure panels 14 can be found on minivans, high-end cars, or sport utility vehicles (SUVs) and the like. As such, it is recognized that movement of the closure panel 14 can be manual or power assisted during intended operation of closure panel 14, for example, between fully closed (e.g. locked or latched) and fully open positions (e.g. unlocked or unlatched); between locked/latched and partially open positions (e.g. unlocked or unlatched); and/or between partially open (e.g. unlocked or unlatched) and fully open positions (e.g. unlocked or unlatched). It is recognized that the partially open position of the closure panel 14 can also include a secondary lock position.

In terms of vehicles 10, closure panel 14 may be a driver/passenger door, a lift gate, or it may be some other kind of closure panel 14, such as an upward-swinging vehicle door (i.e. what is sometimes referred to as a gull-wing door) or a conventional type of door that is hinged at a front-facing or back-facing edge of the door, and so allows the door to swing (or slide) away from (or toward) the opening in body 12 of vehicle 10. Also contemplated are sliding door embodiments of closure panel 14 and canopy door embodiments of closure panel 14, such that sliding doors can be a type of door that open by sliding horizontally or vertically, whereby the door is either mounted on, or suspended from a track that provides for a larger opening. Canopy doors are a type of door that sit on top of the vehicle and lift up in some way, to provide access for vehicle passengers via the opening (e.g. car canopy, aircraft canopy, etc.). Canopy doors can be connected (e.g. hinged at a defined pivot axis and/or connected for travel along a track) to the body 12 of the vehicle 10 at the front, side or back of the door, as the application permits. It is recognized that body 12 can be represented as a body panel of vehicle 10, a frame of vehicle 10, and/or a combination frame and body panel assembly, as desired.

Figure 2:
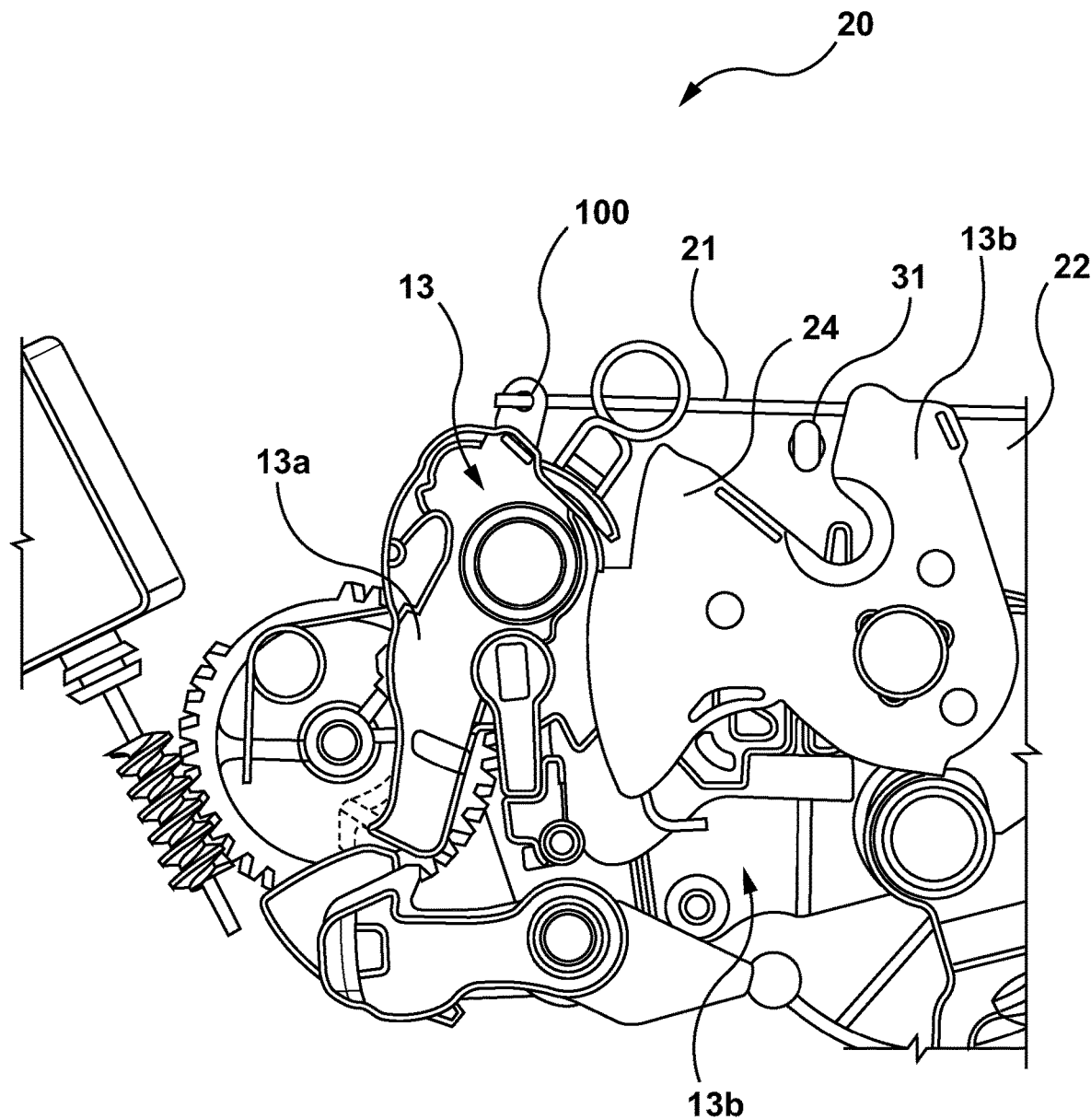
FIG. 2 is a plan view of the latch assembly shown in FIG. 1 with a portion of a housing of the latch omitted.
Figure 5:
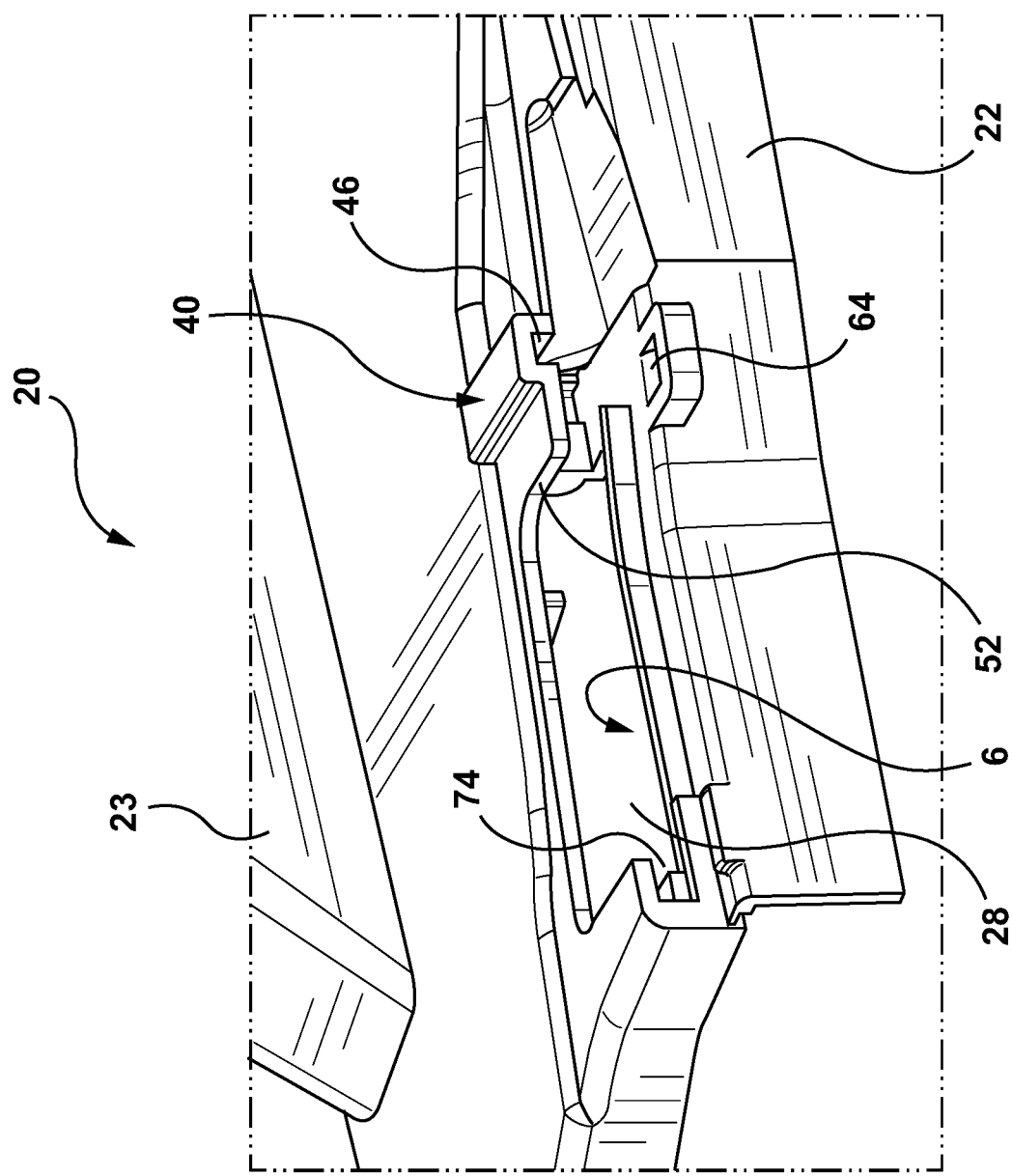
FIG. 5 is a perspective view of the latch assembly of FIG. 1 with the cable bushing shown uncoupled from the cover.

Referring to FIGS. 2, 3 and 5, the cover 23 has a receptacle 28 for receiving a body 29 of the cable bushing 19. It is recognized that the body 29 is assembled into the receptacle 28 once the release cable 21 is connected by the installer to one or more of the internal components 13. Similarly, the body 29 can be removed from the receptacle 28 by the installer, before the release cable 21 is disconnected from the one or more internal components 13.

Figure 4:
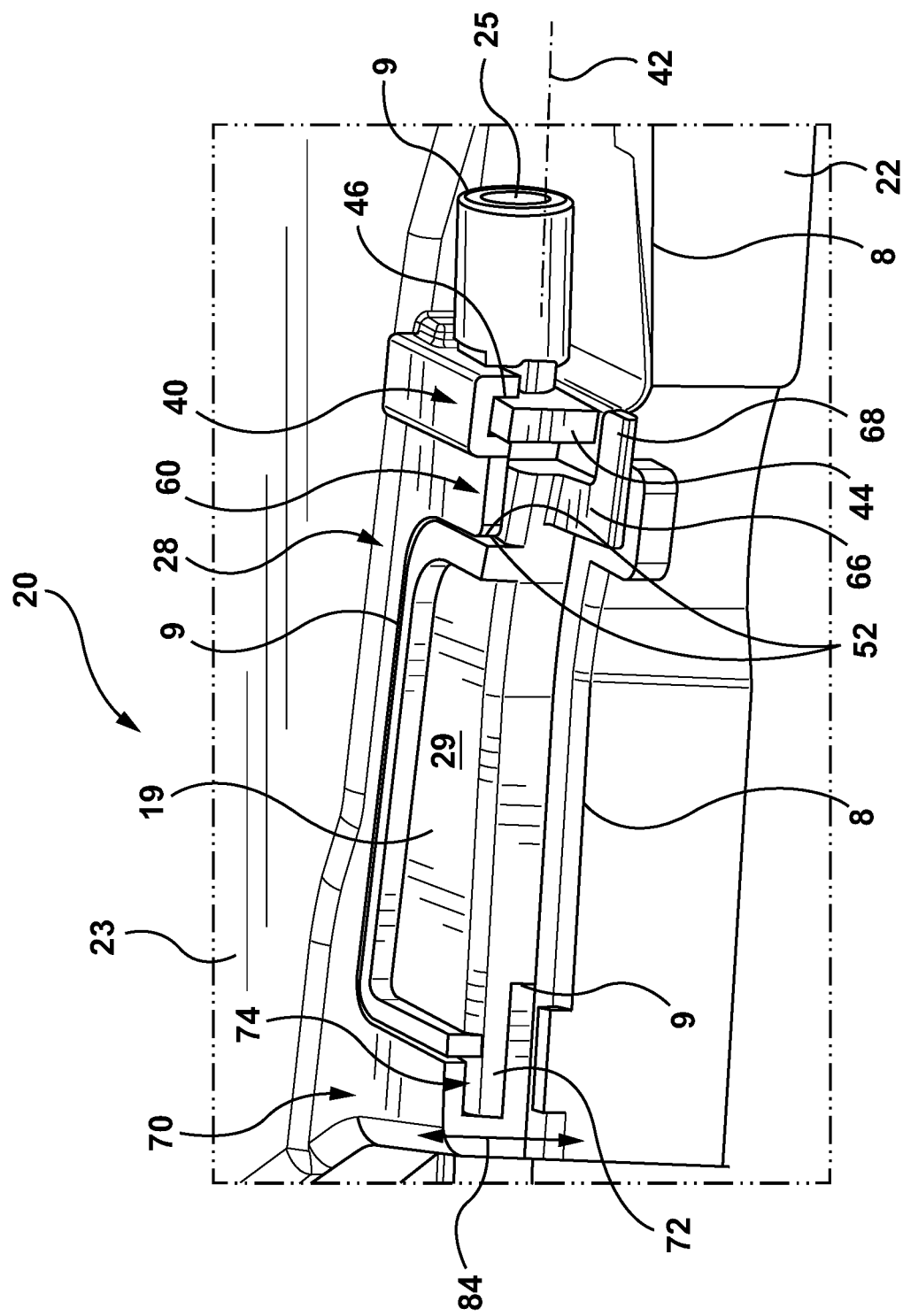
FIG. 4 is a perspective view of the latch assembly of FIG. 1 with the cable bushing shown coupled to the cover and retained by a retaining mechanism.

Referring to FIG. 4, the cover 23 and associated cable bushing 19 have a retaining mechanism 40 for resisting disconnection of the cable bushing 19 from the cover 23 due to any tension forces (e.g. pulling forces) generated along a longitudinal axis 42 of the release cable 21 (shown in FIG. 4), once the body 29 is installed in the receptacle 28. The retaining mechanism 40 can consist of a pin 44 and slot 46 arrangement, such that shown by example the cable bushing 19 has the pin 44 for mating with the slot 46 of the cover 23. It is also recognized that the cable bushing 19 could have the slot 46 while the housing has the pin 44 (not shown), as desired. The slot 46 of the retaining mechanism 40 is oriented transverse to the longitudinal axis 42, so as to allow for removal of the pin 44 from the slot 46 (and thus the cable bushing 19 from the cover 23) during disassembly of the cable bushing 19 from the cover 23. As well, the transverse orientation allows for insertion of the pin 44 into the slot 46 (and thus connecting the cable bushing 19 to the cover 23)

during assembly of the cable bushing 19 from the cover 23. As such, assembly and disassembly (i.e. the body 29 into or out of the receptacle 28) of the cable bushing 19 with respect to the cover 23 is accomplished by moving the cable bushing 19 with respect to the cover 23 in a direction transverse to the longitudinal axis 42 of the release cable 21, such positioning of the pin 44 in the slot 46 engages the retaining mechanism 40 and positioning of the pin 44 out the slot 46 disengages the retaining mechanism 40. As such, the retaining mechanism 40 provides for movement of the body 29 within the receptacle 28 along a first degree of freedom 80 (transverse to the longitudinal axis 42), while inhibiting movement along a second degree of freedom 82 along the longitudinal axis 42 (see FIG. 3).

Alternatively, or in addition to, the cable bushing 19 can also have a retaining mechanism 50 comprising one or more abutment surfaces 52 for resisting disconnection of the cable bushing 19 from the cover 23 during application of any tension forces (e.g. pulling forces) generated along the longitudinal axis 42 of the release cable 21 (shown in FIG. 4). In this case, one of the abutment surfaces 52 is on the cover 23 adjacent to the receptacle 28 and the mating abutment surface 52 is on the body 29 of the cable bushing 19, such that a length of contact surfaces of the abutment surfaces 52 is oriented transverse to the longitudinal axis 42.

Figure 6:
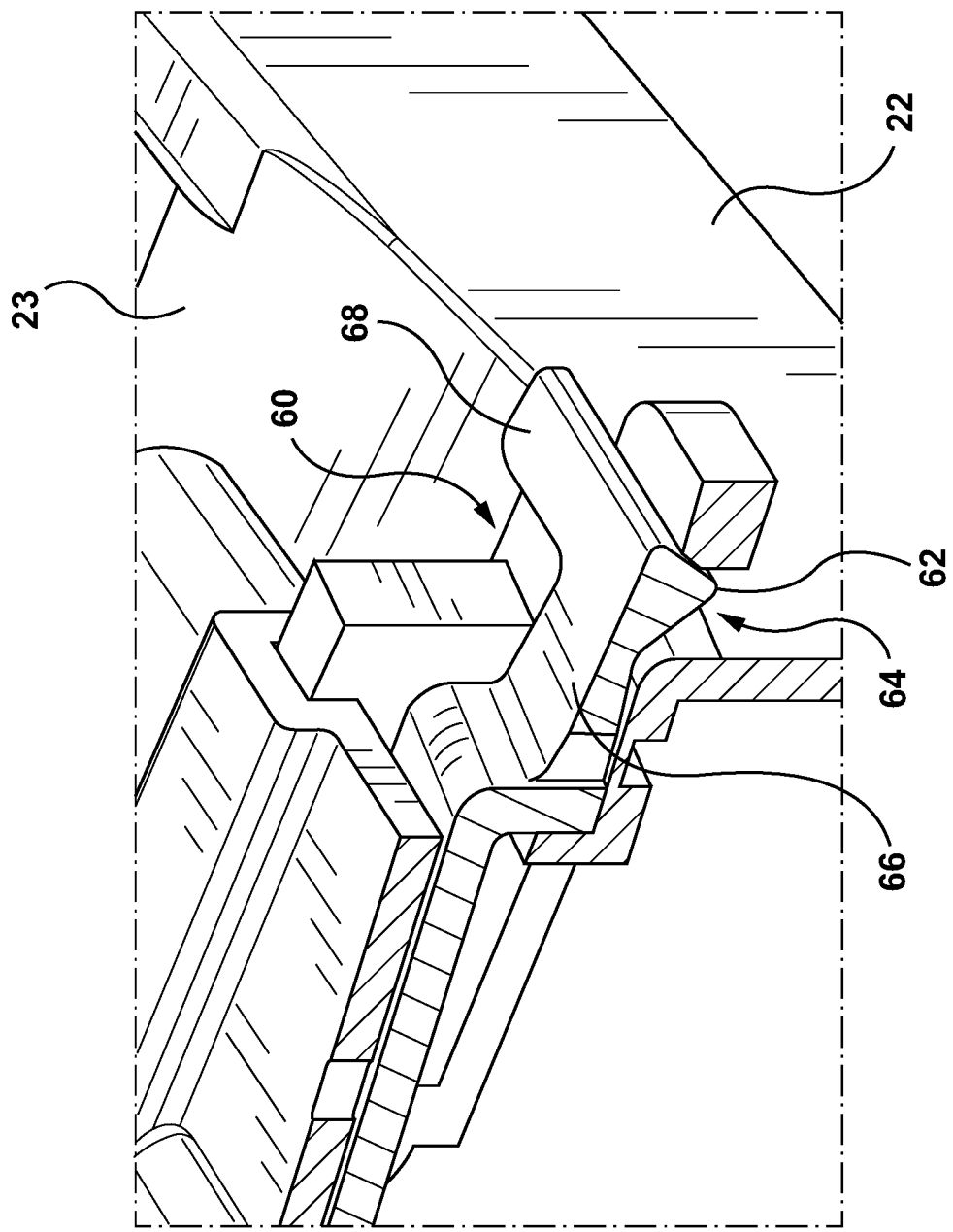
FIG. 6 is a perspective view of a portion of the latch assembly of FIG. 4 showing the cable bushing coupled to the cover by a coupling mechanism.
Figure 7:
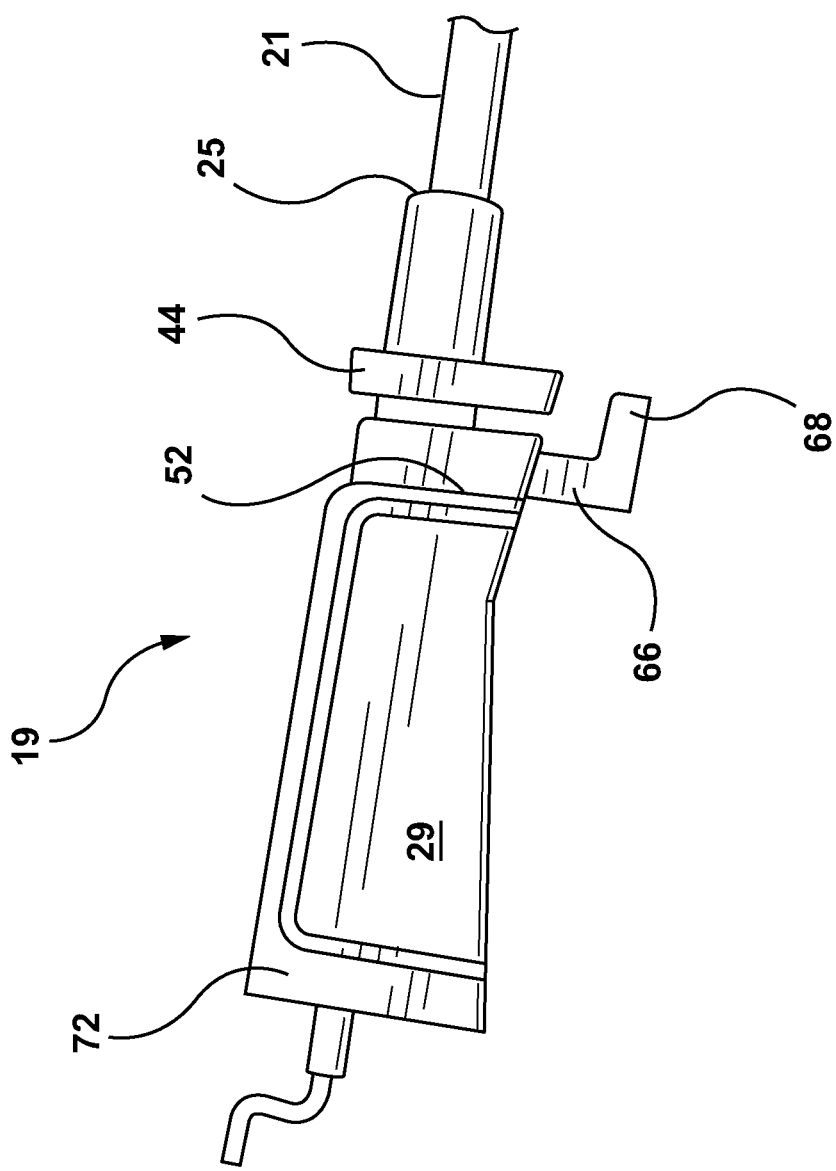
FIG. 7 is perspective view of the cable bushing of FIG. 3.

Referring to FIGS. 5 and 6, the cover 23 and associated cable bushing 19 have a coupling mechanism 60 for releasably coupling the cable bushing 19 to the cover 23. The coupling mechanism 60 can also be referred to as a lock mechanism for releasably locking the body 29 to the receptacle 28 of the cover 23. The coupling mechanism 60 comprises a tab 62 and a slot 64, such that the slot 64 is configured to receive the tab 62 (i.e. positioning of the tab 62 in the slot 64 engages the coupling mechanism 60, while positioning of the tab 62 out of the slot 64 disengages the coupling mechanism 60). The tab 62 is positioned on a resilient arm 66, so as to facilitate operation (i.e. movement) of the tab 62 by the installer into and out of the slot 64 as desired. The resilient arm 66 can also have a lever 68 for facilitating operation of the coupling mechanism 60 by the installer, i.e. bending the resilient arm 66 in order to remove the tab 62 from the slot 64, for ease of disassembly of the cable bushing 19 from the cover 23. As shown, it is recognized that the tab 62 and associated resilient arm 66 can be positioned on the body 29 of the cable bushing 19, while the mating slot is positioned on the cover 23. Alternatively, not shown, it is recognized that the tab 62 and associated resilient arm 66 can be positioned on the cover 23, while the mating slot is positioned on the body 29 of the cable bushing 19. The coupling mechanism 60 includes the tab 62 and slot 64 arrangement for releasably coupling the body 29 of the cable bushing 19 in the receptacle 28 of the cover 23, such that the tab 62 is positioned on the resilient arm 66 for biasing the tab 62 into engagement with the slot 64 when positioned adjacent thereto.

By example, in order to connect the cable bushing 19 to the cover 23, the installer would slide the body 29 into the receptacle 28 in a direction transverse to the longitudinal axis 42, as guided by movement of the pin 44 in the slot 46. Once the body 29 is seated in the receptacle 28, the tab 62 is received in the slot 64, thus releasably locking the body 29 in the receptacle 28. As such, the retaining mechanism 40 (once engaged) is used to resist any tension (i.e. pulling) forces along the longitudinal axis 42 which could disconnect the body 29 from the receptacle 28, while the coupling mechanism 60 (once engaged) is used to resist any forces applied to the body 29 transverse to the longitudinal axis 42 which could also disconnect the body 29 from the receptacle 28.

Referring again to FIGS. 4 and 5, shown is a further retaining mechanism 70 of the cable bushing 19 opposed to the retaining mechanism 40. The retaining mechanism 70 can be used to provide for movement of the body 29 within the receptacle 28 along the first degree of freedom 80 (transverse to the longitudinal axis 42—see FIG. 3), while inhibiting movement along a third degree of freedom 84 (also transverse to the longitudinal axis 42). The retaining mechanism 70 can include a pin 72 and slot 74 arrangement, such that shown by example the cable bushing 19 has the pin 72 for mating with the slot 74 of the cover 23. It is also recognized that the cable bushing 19 could have the slot 74 while the housing has the pin 72 (not shown), as desired. The slot 74 of the retaining mechanism 70 is oriented transverse to the longitudinal axis 42, so as to allow for removal of the pin 72 from the slot 74 (and thus the cable bushing 19 from the cover 23) during disassembly of the cable bushing 19 from the cover 23. As well, the transverse orientation allows for insertion of the pin 72 into the slot 74 (and thus connecting the cable bushing 19 to the cover 23) during assembly of the cable bushing 19 to the cover 23. As such, assembly and disassembly (i.e. the body 29 into or out of the receptacle 28) of the cable bushing 19 with respect to the cover 23 is accomplished by moving the cable bushing 19 with respect to the cover 23 in a direction transverse to the longitudinal axis 42 of the release cable 21, such positioning of the pin 73 in the slot 74 engages the retaining mechanism 70 and positioning of the pin 72 out the slot 74 disengages the retaining mechanism 70.

Figure 8:
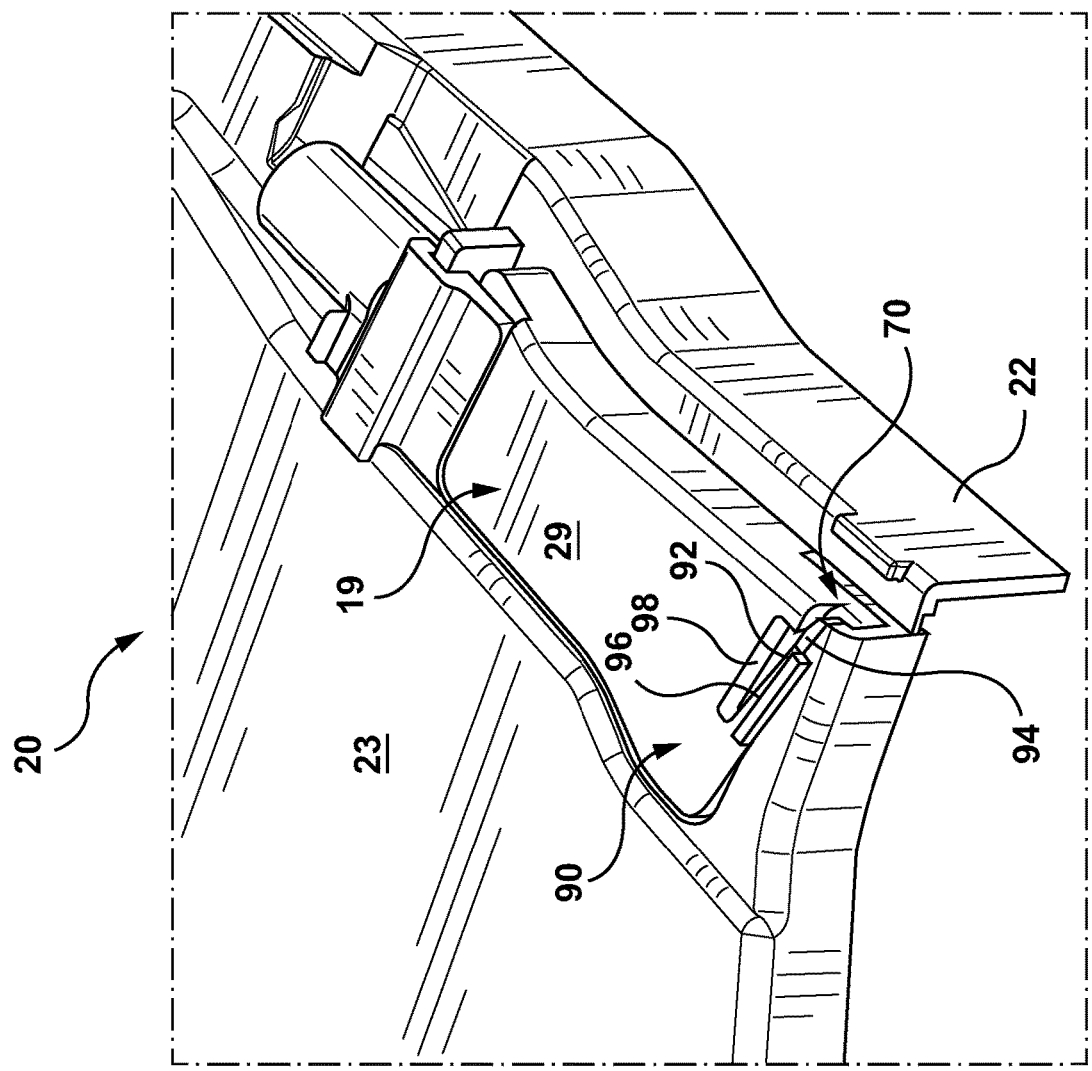
FIG. 8 is an alternative embodiment of the coupling mechanism of FIG. 4.

Referring to FIG. 8, shown is an alternative embodiment of the cable bushing 19. The cable bushing 19 can have an optional coupling mechanism 90 (e.g. a locking mechanism) consisting of a tab 92 and a slot 94 (e.g. one or more abutment surfaces). The coupling mechanism 90 can be for releasably coupling the cable bushing 19 to the cover 23 in addition to or otherwise alternative to the coupling mechanism 60 (see FIG. 4). The coupling mechanism 90 can also be referred to as a lock mechanism for releasably locking the body 29 to the receptacle 28 of the cover 23. The coupling mechanism 90 comprises the tab 92 and the slot 94, such that the slot 94 is configured to receive the tab 92 (i.e. positioning of the tab 92 in the slot 94 engages the coupling mechanism 90, while positioning of the tab 92 out of the slot 94 disengages the coupling mechanism 90). The tab 92 is positioned on a resilient arm 96, so as to facilitate operation (i.e. movement) of the tab 92 by the installer into and out of the slot 94 as desired. The resilient arm 96 can also have a recess 98 formed in the body 29, in order to facilitate operation of the coupling mechanism 90 by the installer, i.e. bending the resilient arm 96 into the recess 98 in order to remove the tab 92 from the slot 94, for ease of disassembly of the cable bushing 19 from the cover 23. As shown, it is recognized that the tab 92 and associated resilient arm 96 can be positioned on the body 29 of the cable bushing 19, while the mating slot 94 is positioned on the cover 23. Alternatively, not shown, it is recognized that the tab 92 and associated resilient arm 96 can be positioned on the cover 23, while the mating slot 94 and recess 98 is positioned on the body 29 of the cable bushing 19. The coupling mechanism 90 includes the tab 92 and slot 94 arrangement for releasably coupling the body 29 of the cable bushing 19 in the receptacle 28 of the cover 23, such that the tab 92 is positioned on the resilient arm 96 for biasing the tab 92 into engagement with the slot 94 when positioned adjacent thereto.

By example, in order to connect the cable bushing 19 to the cover 23, the installer would slide the body 29 into the receptacle 28 in a direction transverse to the longitudinal axis 42, as guided by movement of the pin 44 in the slot 46. Once the body 29 is seated in the receptacle 28, the tab 92 is received in the slot 94, thus releasably locking the body 29 in the receptacle 28. As such, the retaining mechanism 40 (once engaged) is used to resist any tension (i.e. pulling) forces along the longitudinal axis 42 which could disconnect the body 29 from the receptacle 28, while the coupling mechanism 90 (once engaged) is used to resist any forces applied to the body 29 transverse to the longitudinal axis 42 which could also disconnect the body 29 from the receptacle 28.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A latch assembly (20) for a vehicle closure panel (14), comprising:
    a housing (22) having an interior (13*b*) sized for receipt of internal components (13) of the latch assembly;
    a cover (23) attached to the housing to enclose at least a portion of said interior, the cover having a receptacle (28) for receiving a body (29) of a cable bushing (19), the receptacle oriented for receiving the body in a first direction along a first degree of freedom while also inhibiting movement of the body in a second direction along a second degree of freedom, such that the first degree of freedom is transverse to the second degree of freedom and the second degree of freedom is directed along a longitudinal axis (42);
    at least one release cable (21) configured for operable connection to at least one of the internal components, the at least one release cable having the longitudinal axis (42), such that one end of the release cable is connected to the body of the cable bushing;
    the body of the cable bushing (19) releasably attached to the cover once inserted in the first direction and having at least one opening (25) sized for receipt of the at least one release cable there through; and
    a retaining mechanism (40, 50, 70) oriented transverse to the longitudinal axis for inhibiting disconnection of the body of the cable bushing from the cover in the second direction along the longitudinal axis;
    wherein the body is insertable and removeable from the receptacle along the first degree of freedom guided by a pair of slots located at opposite sides of the receptacle, such that once the body is received in the receptacle, the body is only configured for motion in the first direction when the retaining mechanism is disengaged from the body;
    wherein the cable bushing is restricted from moving in the second direction when the body is in the receptacle;
    wherein the retaining mechanism prevents any movement in the direction of the cable.

2. The latch assembly of claim 1, wherein the retaining mechanism comprises a slot (46, 74) and a pin (44, 72) configured for engagement into and out of the slot.

3. The latch assembly of claim 2, wherein the slot is positioned on the cover and the pin is positioned on a body (29) of the cable bushing.

4. The latch assembly of claim 1, wherein the release cable (21) is coupled indirectly to a pivotal latch member (24) by a lever (100) as said one of the internal components.

5. The latch assembly of claim 1, wherein the release cable (21) is coupled indirectly to a pivotal latch member (24) by a pawl (13*a*) as said one of the internal components.

6. The latch assembly of claim 1, wherein the cover includes a first abutment surface (52) of the receptacle (28) positioned opposite to a second mating abutment surface (52) on the body (29) of the cable bushing (19), such that when the body is received within the receptacle the first abutment surface is engaged with the second mating abutment surface in order to inhibit movement of the body in the first direction when the retaining mechanism is engaged with the body, wherein a length of a contact surface between the first abutment surface and the second mating abutment surface is oriented transverse to the longitudinal axis.

7. The latch assembly of claim 1, further comprising a coupling mechanism (60, 90) including a tab (62, 92) and slot (64, 94) arrangement for releasably coupling a body (29) of the cable bushing in a receptacle (28) of the cover, such that one of the tab or the slot is positioned on a resilient arm (66, 96) for biasing the tab into engagement with the slot when positioned adjacent thereto.

8. The latch assembly of claim 7, wherein engagement of the tab with the slot provides a lock mechanism to releasably lock the body in the receptacle.

9. The latch assembly of claim 7, wherein the body has a recess (98) to facilitate movement of the resilient arm during operation of the coupling mechanism (90).

10. The latch assembly of claim 7, wherein the slot is positioned on the cover and the tab is positioned on the body of the cable bushing.

11. The latch of claim 1 wherein the cable bushing and the cover include a sealed interface configured to inhibit an ingress of water into the interior.

12. The latch of claim 1 wherein the latch includes one or more seal members at an interface between the cover and the cable bushing, the one or more seal members to inhibit an ingress of water into the interior.

13. A latch assembly for a vehicle closure panel, comprising:
    a housing having an interior sized for receipt of internal components of the latch assembly;
    a cover attached to the housing to enclose at least a portion of the interior, the cover having a receptacle for receiving a body of a cable bushing, the receptacle oriented for receiving the body in a first direction along a first degree of freedom while also inhibiting movement of the body in a second direction along a second degree of freedom, such that the first degree of freedom is transverse to the second degree of freedom and the second degree of freedom is directed along a longitudinal axis;
    at least one release cable configured for operable connection to at least one of the internal components, the at least one release cable having the longitudinal axis, such that one end of the release cable is connected to the body of the cable bushing;
    the body of the cable bushing releasably attached to the cover once inserted along the first degree of freedom and having at least one opening sized for receipt of the at least one release cable therethrough; and a coupling mechanism (60, 90) including a tab (62, 92) and slot (64, 94) arrangement for releasably coupling the body (29) of the cable bushing in the receptacle (28) of the cover, such that one of the tab or the slot is positioned on a resilient arm (66, 96) for biasing the tab into engagement with the slot when positioned adjacent thereto, such that the coupling mechanism inhibits movement of the body along the second degree of freedom, wherein the tab is provided on the exterior of the cover for facilitating removal of the cable bushing;

wherein the body is insertable and removeable from the receptacle along the first degree of freedom, such that once the body is received in the receptacle, the body is only configured for motion in the first direction when the coupling mechanism is disengaged from the body;

wherein the cable bushing is restricted from moving in the second direction when the body is in the receptacle;

wherein the coupling mechanism prevents any movement in the direction of the cable.

14. The latch assembly of claim 13, wherein the slot is positioned or the cover and the tab is positioned on the body of the cable bushing.

15. The latch assembly of claim 13, wherein engagement of the tab with the slot provides a lock mechanism to releasably lock the body in the receptacle.

16. The latch assembly of claim 13, wherein the body has a recess (98) to facilitate movement of the resilient arm during operation of the coupling mechanism (90).

17. The latch assembly of claim 13, wherein the slot is positioned or the cover and the tab is positioned on the body of the cable bushing.

18. The latch assembly of claim 13, further comprising a retaining mechanism (40, 50, 70) oriented transverse to the longitudinal axis for inhibiting disconnection of the cable bushing from the cover in a direction along the longitudinal axis.

19. The latch assembly of claim 18, wherein the retaining mechanism comprises a slot (46, 74) and a pin (44, 72) configured for engagement into and out of the slot.

20. The latch assembly of claim 18, wherein the slot is positioned on the cover and the pin is positioned on a body (29) of the cable bushing.

21. The latch assembly of claim 13, wherein the release cable (21) is coupled indirectly to a pivotal latch member (24) by a lever (100) as said one of the internal components.

22. The latch assembly of claim 18, wherein the cover includes a first abutment surface (52) of the receptacle (28) positioned opposite to a second mating abutment surface (52) on the body (29) of the cable bushing (19), such that when the body is received within the receptacle the first abutment surface is engaged with the second mating abutment surface in order to inhibit movement of the body in the first direction when the retaining mechanism is engaged with the body, wherein a length of a contact surface between the first abutment surface and the second mating abutment surface is oriented transverse to the longitudinal axis.

* * * * *